Patented Jan. 18, 1938

2,105,477

UNITED STATES PATENT OFFICE 2,105,477

TONIC FOOD PRODUCT AND PROCESS OF MAKING SAME

Fanny Matlack Godfrey, Tarrytown, N. Y., and Robert Wentworth Floyd, Bloomfield, N. J.; said Floyd assignor to said Godfrey No Drawing. Application March 4, 1936, Serial No. 67,176

5 Claims. (Cl. 99—110)

The present invention relates to a novel, readily assimilable and tonic food, in liquid, paste, tablet, powder or other form, containing meat extract and dissolved or soluble albumen and/or soluble, uncooked and uncoagulated egg-albumen; produced without neutralizing the natural acidity of the meat extract (or without substantially neutralizing the same) and including or excluding usual common salt content of meat extracts, and including or excluding monosodium glutamate. (This latter, if used, improves the flavor.)

"Meat extracts" made by cooking up meat (including beef and others) with water, removing the undissolved portions of the meat (e. g. by straining) and subsequently concentrating the solution and adding common salt as a flavoring and preservative are well known upon the market, in many different degrees of concentration, from heavy paste to syrupy form.

However, in the production of meat extract, the albumen is almost completely lost; partly through precipitation by the acids, or by the acid salts natural to the meat extract; partly through the salting out by the salts of the extract; and partly by coagulation at high temperatures required in the process, with consequent loss in nutritional value and palatability.

It is also well known that subsequent addition, or reincorporation, of albumen has been impracticable because the albumen is likewise precipitated, insolubly, by the acids and salts contained in the extract. Any excess of 5% or sometimes even less (according to particular extract) being so precipitated, according to information available.

Instead, however, of an albumenless meat extract, or one with at best but a negligible amount of albumen added, the present invention contemplates the addition of 10%, 25%, 50%, or whatever proportion may be desired, of soluble albumen or soluble uncooked albumen (in a chemically unmodified state) in its most readily assimilable form, without precipitation and without the necessity of neutralizing the acids and salts common to meat extracts.

It will be understood that meat preparations of this kind, containing considerable quantities of albumen, will be more nutritious and also more palatable than meat extracts alone; and that addition of the albumen in soluble form provides nutrition material in its most readily and rapidly assimilable form, an object of great value in the feeding of delicate persons or animals requiring a substantial amount of animal proteins in their diet.

In accordance with the present invention, it has been found that uncooked, uncoagulated, egg-albumen can be combined with un-neutralized meat extract, without precipitation, in almost any desired percentage. As for instance, by dissolving the meat extract in a modicum of water and adding brandy or other alcoholic beverage; then well mixing it with fresh egg-whites (or spray-dried egg-whites with, say, ½ their original moisture restored); the albumen will remain in solution and will not be precipitated.

In accordance with the present invention, it has been found that palatability is increased by admixture of monosodium glutamate, which has a taste threshold fifteen times as great as sugar and seven times as great as common salt; this in connection with seasoning mixtures containing the usual meat extracts in which are found about 4% or 5% of common salt, and which meat extracts constitute starting material for manufacturing under purposes of this invention. It is contemplated, however, as a substitute or alternate starting material to manufacture a saltless meat extract, one in which no common salt or only a modicum thereof will be used, its place being taken entirely or in part by monosodium glutamate, particularly where use of common salt is contraindicated organically, functionally, by taste preference, or because of thirst-provoking effect; and for these same reasons it is contemplated to produce this saltless meat extract as a finished product as well as an alternate starting material for admixture with albumens, and to still further concentrate said saltless meat extract into powder, tablets or otherwise, with or without other admixtures.

This same course is reserved in the drying, spray-drying, tableting, etc. of the meat extract combined with albumen, in accordance with the present invention. It also is to be understood that other materials such as acacia, slippery-elm, malt, or other edible materials, may be combined with and to a proper consistency of later described mixtures and then reduced to syrup or paste form, dried or spray-dried, and/or further compressed into tablet form. The objective being to provide a highly nutritious emergency or other ration; also, in combination with proper ingredients, formulae suitable to a variety of human requirements, adding nutritional or other values to recognized medical prescriptions.

The starting material, in accordance with the present invention, is meat extract; either the usual meat extract (salted) or that contemplated in this invention (with monosodium glutamate instead of common salt). Concentration of meat extract employed may be that of stiff paste, heavy molasses, or syrup.

To any determined quantity or concentration of meat extract, of either kind, is added a modicum of boiling, sterile water; just sufficient to dissolve; the amount required would depend, of course, upon relative concentration and consequent water-content. For convenience, this may be termed "meat solution".

To this "meat solution" is then added brandy, or other distilled liquor of essentially high alcoholic content; or of the addition of the corresponding amount of ethyl alcohol of about 100 proof; the amount of which may of course vary, but a satisfactory proportion has been found to be ⅛th part, by volume of a 100 proof alcoholic beverage, to one part by volume of the combined "meat solution" and "albumen solution" described below. The alcoholic beverage may be brandy, or similar distillate.

While fresh egg-whites, or other albumen dissolved in a modicum of water, can be employed, the use of spray-dried egg-whites is to be recommended; greater primary concentration is attained because the amount of water needed to induce solution is only ½ or less of the original water content, before spray-drying. We will call this "albumen solution."

There appears to be no maximum percentage of albumen which can be combined with meat extract, without precipitation or loss of solubility by following the above steps and then adding (preferably to the "meat solution") a flexible amount of distilled liquor or its equivalent, before adding "albumen solution."

As, for example,—6 parts "meat solution" (66⅔%), 2 parts "albumen solution" (22⅔%), 1 part liquor (11⅛%). Or 4 parts "meat solution" (44⅘%), 4 parts "albumen solution" (44⅘%), 1 part liquor (11⅛%). Or 3 parts "meat solution" (33⅗%), 5 parts "albumen solution" (55⅗%), and 1 part liquor (11⅛%). In each instance noted the resultant alcoholic content (with 100 proof liquor) would only be about 5½%.

Such a liquid, whether compounded from any of the well known types of meat extract (containing common salt) or from the new type of meat extract contemplated in this invention (where monosodium glutamate is added to or entirely substituted for salt) already has a rich flavor, which may be further seasoned if desired at this point. It will be understood that where egg-albumen is used, that no temperatures sufficient to cook or to coagulate it is employed at any stage of the process. Such a liquid would not usually be stable (unless kept refrigerated), so a small amount of a chemical preservative may be added; for example 0.1% of benzoic acid or an equivalent amount of other substantially harmless chemical preservative.

This liquid is not only highly nourishing and readily assimilable, but relatively small and dilute doses are capable of sustaining life over considerable periods. Being concentrated, it may be taken diluted or full strength. For children, as well as small or young animals, it is preferable to dilute with, say, an equal amount of water; a teaspoonful to a tablespoonful being the usual dose, repeated as frequently as conditions indicate. The alcoholic content is insufficient to produce stimulation in the maximum amounts one could palatably tolerate the meat extract concentrate content. Where alcoholic stimulation is desired therefore, it must be given in addition to this concentrated liquid food tonic.

In accordance with the present invention, it is intended to carry on from above point, or other suitable consistencies of the materials (meat extract, albumen, common salt and/or monosodium glutamate, with or without other compatible materials) to other final forms, such as paste, powder, tablets etc. Also, as has been stated, to include the production of a new meat extract, in any form or consistency (paste, syrup, dried, powdered, tablet etc.) which contains monosodium glutamate in place of common salt, or monosodium glutamate with a modicum of common salt.

It is also proposed and contemplated to prepare a liquid food tonic, substantially as detailed and combining meat extract, albumen, common salt and/or monosodium glutamate, with or without other materials and decreased in concentration by addition of wine or such other tonic and stimulating or restorative media as the best practice may indicate. The whole material, in whatever form prepared, constituting a food-tonic of high nutritional value, readily assimilated, and capable of sustaining life over considerable periods, in emergency or inability to take solids.

Saving for ourselves such equivalents as occur to those skilled in the art to which the present application relates, what we desire to protect by Letters Patent is the hereunto appended claims:—

1. A solution of concentrate of meat extract combined with mono-sodium glutamate, readily soluble albumen and a substantial amount of ethyl alcohol, for retaining the albumen in a soluble condition, substantially free from common salt.

2. A solution of a concentrate of meat extract as set forth in claim 1, containing dissolved, unmodified, uncooked egg-albumen.

3. A solution of a concentrate of a meat extract, containing dissolved, unmodified, uncooked egg-albumen, mono-sodium glutamate and an alcoholic beverage in amount sufficient to retain the albumen in solution, and substantially free from common salt.

4. A solution of a concentrate of meat extract containing dissolved, unmodified, uncooked, egg-albumen, which solution contains at least a substantial proportion of the original acidity of the meat extract, said solution also containing a substantial amount of ethyl alcohol to retain the albumen in solution.

5. An edible product containing un-neutralized meat extract, sodium glutamate, containing over 5% of albumen in a readily soluble condition and containing an alcoholic beverage, the latter serving to maintain the solubility of the albumen.

FANNY MATLACK GODFREY.
ROBERT WENTWORTH FLOYD.